(12) United States Patent
Ogata et al.

(10) Patent No.: US 12,197,656 B2
(45) Date of Patent: Jan. 14, 2025

(54) ELECTRONIC PEN

(71) Applicant: Wacom Co., Ltd., Saitama (JP)

(72) Inventors: Mamoru Ogata, Saitama (JP); Kenichi Ninomiya, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/435,675

(22) Filed: Feb. 7, 2024

(65) Prior Publication Data

US 2024/0176434 A1 May 30, 2024

Related U.S. Application Data

(63) Continuation of application No. PCT/JP2022/028600, filed on Jul. 25, 2022.

(30) Foreign Application Priority Data

Aug. 13, 2021 (JP) .................................. 2021-131920

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01); *G06F 2203/0381* (2013.01)

(58) Field of Classification Search
None
See application file for complete search history.

(56) References Cited

U.S. PATENT DOCUMENTS

2016/0378211 A1* 12/2016 Kim ........................ G06F 3/038
345/173

FOREIGN PATENT DOCUMENTS

| CN | 111338488 A | * | 6/2020 |
| JP | H10301696 A | | 11/1998 |
| KR | 20170112566 A | * | 10/2017 |

OTHER PUBLICATIONS

Translation of CN-111338488-A into English; Liu. (Year: 2020).*
Translation of KR-20170112566-A into English, Park et al. (Year: 2017).*
English Translation of International Search Report dated Sep. 27, 2022, for the corresponding International Patent Application No. PCT/JP2022/028600, 2 pages.

* cited by examiner

*Primary Examiner* — Brian M Butcher
(74) *Attorney, Agent, or Firm* — Seed IP Law Group LLP

(57) ABSTRACT

Provided is an electronic pen that includes a circuit board including one or more push switches, a housing having a cylindrical body in which an electronic pen circuit including the circuit board is mounted, the housing including a side opening at a position corresponding to a range in which the one or more push switches are provided on the circuit board mounted at a predetermined position, a board protection member including a main body part and one or more depression parts, and a side attachment member including a plate part and one or more push parts. When one of the one or more push parts of the side attachment member is pushed down, a corresponding one of the one or more push switches on the circuit board is pushed down via a corresponding one of the one or more depression parts of the board protection member.

9 Claims, 5 Drawing Sheets

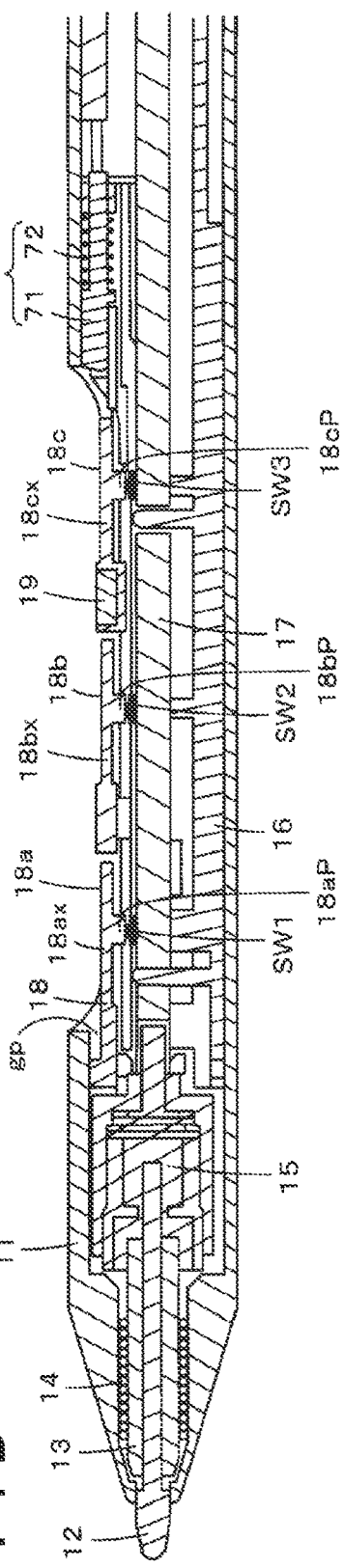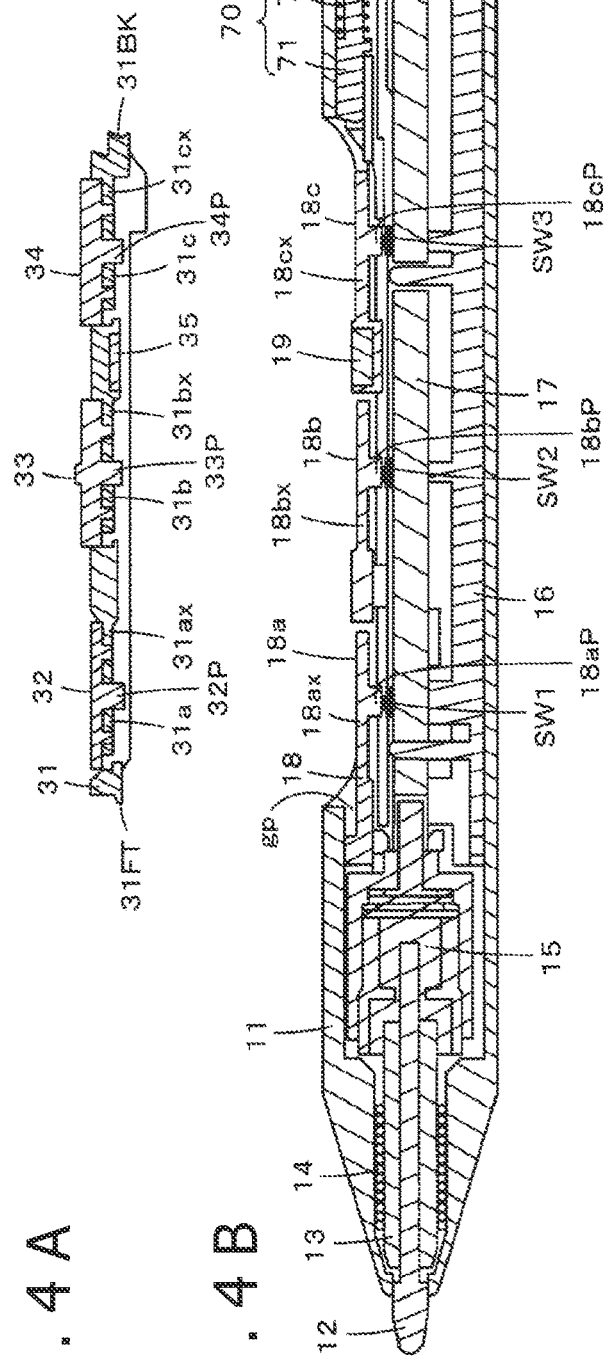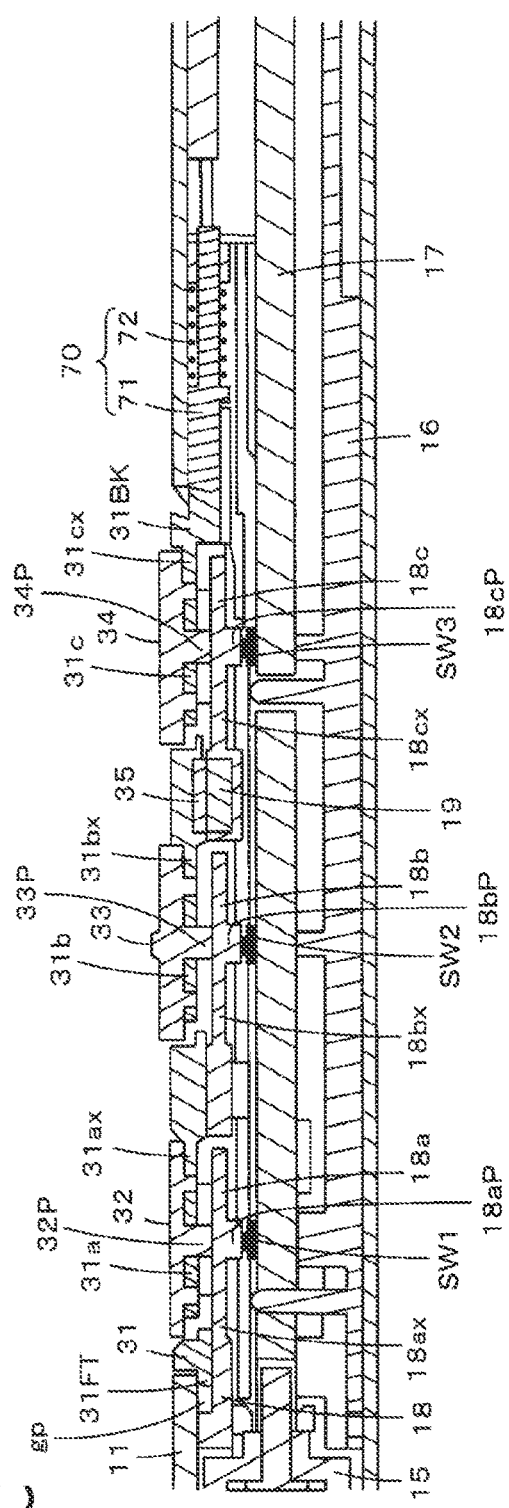
FIG. 4A
FIG. 4B
FIG. 4C

ELECTRONIC PEN

BACKGROUND

Technical Field

The present disclosure relates to an electronic pen that is capable of inputting information by indicating coordinates to a position detection device mounted in an electronic device such as, for example, a tablet personal computer (PC).

Description of the Related Art

Some electronic devices such as, for example, tablet PCs and high-functional mobile phone terminals called smartphones enable electronic pens to perform indication input in order to allow more detailed drawing input through position detection devices mounted in the electronic devices. Among such electronic pens, there are electronic pens in which what is called side switches are available. A side switch in an electronic pen means a switch provided on a side surface of the electronic pen such that a user can operate the side switch with his/her finger while holding the electronic pen. As with a click button of what is called a mouse which is a pointing device for a PC, the side switch allows the user to check the indicated position or open a window and select a function to be executed, for example.

For example, when an image is created by using computer graphics (CG) technology, the side switch is frequently used to operate an airbrush function or change the selection of the color to be used. On the other hand, the side switch is rarely used when, for example, characters are input. In this way, even if side switch functions are available, the side switch functions may rarely be used depending on the application being executed. For this reason, Japanese Patent Laid-Open No. Hei 10-301696 (hereinafter referred to as Patent Document 1) discloses an invention relating to a position indicator (electronic pen) in which a side switch operation part is detachably attachable to, as a unit, a main body of the position indicator. With this configuration, the side switch operation part can be attached or detached according to the frequency of use of the side switch.

In the case of the invention disclosed in Patent Document 1, the side switch operation part (side switch unit) is fixed to the main body of the position indicator by tensioning screws, so that the side switch unit can firmly be attached thereto. However, it is time-consuming and troublesome to attach and detach the side switch unit. Moreover, in the case of the invention disclosed in Patent Document 1, the side switch unit significantly protrudes from the main body of the position indicator in a direction intersecting an axial direction. While some users prefer such a configuration, others want a side switch to be provided so as not to protrude from the main body of the position indicator too much.

Further, in the case of the invention disclosed in Patent Document 1, when the side switch operation part is detached from the main body of the position indicator, two electrodes for implementing the side switch functions are exposed, which is not desirable since dirt tends to adhere to the electrodes. Hence, it is conceivable to mount a small push switch for implementing the side switch functions, on a circuit board inside the electronic pen, and allow a user to push down the push switch. However, even in this case, since the push switch is provided on the circuit board mounted in the electronic pen, the circuit board on which the push switch is provided is exposed when the side switch operation part is detached from the main body of the position indicator.

If the circuit board is exposed when the side switch operation part is detached from the main body of the position indicator, the user may possibly touch the circuit board, which is likely to cause failures. Moreover, the exposure of the circuit board means that static electricity may also enter the circuit board, which induces malfunctions and failures due to the static electricity, making it impossible to provide a high level of product assurance.

BRIEF SUMMARY

In view of the foregoing, it is desirable to provide an electronic pen having side switch functions that can appropriately protect a mounted circuit board even if a side switch operation part is detachably attachable and that can reliably and appropriately be pushed down.

There is provided an electronic pen including: a circuit board including one or more push switches, a housing having a cylindrical body in which an electronic pen circuit including the circuit board is mounted, the housing including a side opening at a position corresponding to a range in which the one or more push switches are provided on the circuit board mounted at a predetermined position, a board protection member including a main body part provided in the housing, the main body part covering a surface of the circuit board on which the one or more push switches are provided, and the main body part including one or more main body openings corresponding to respective ones of the one or more push switches, one or more depression parts each provided in a corresponding one of the one or more main body openings, each of the one or more depression parts being coupled to the main body part only at one end on one side of the corresponding one of the one or more main body openings such that each of the one or more depression parts, in operation, is movable toward a corresponding one of the one or more push switches, and a side attachment member including a plate part that is detachably attached to the side opening of the housing and that includes one or more plate openings corresponding to respective ones of the one or more depression parts, and one or more push parts each provided in a corresponding one of the one or more plate openings, each of the one or more push parts being coupled to the plate part only at one end of the plate part on a second side of the corresponding one of the one or more plate openings such that each of the one or more push parts, in operation, is movable toward a corresponding one of the one or more push switches. When one of the one or more push parts of the side attachment member is moved toward the corresponding one of the one or more push switches, the corresponding one of the one or more push switches on the circuit board is pushed via a corresponding one of the one or more depression parts of the board protection member.

In this electronic pen, the circuit board including the one or more push switches and the board protection member are mounted inside the housing, and the side opening is provided at the position of the housing corresponding to the range in which the one or more push switches of the mounted circuit board are provided. Each of the one or more depression parts of the board protection member is provided in the corresponding one of the one or more main body openings provided on the main body part of the board protection member. Each of the one or more depression parts is coupled to the main body part only at the one end thereof on the one side of the corresponding one of the one or more main body openings and provided at the position corresponding to the corresponding one of the one or more push switches of the circuit board. Further, each of the one or more push parts of the side attachment member provided in the side opening of the housing is provided in the corresponding one of the one or more plate openings provided on the plate part of the side attachment member and is coupled to the plate part only at the one end thereof on the other side of the corresponding one of the one or more plate openings. Each of the one or more push parts is provided at the position corresponding to the corresponding one of the one or more depression parts of the board protection member. When one of the one or more push parts of the side attachment member is pushed down, another end of the push part on one side of the corresponding plate opening is pushed down more. Accordingly, another end of the corresponding depression part of the board protection member on another side of the corresponding main body opening is pushed down more, so that the corresponding push switch on the circuit board is pushed down.

BRIEF DESCRIPTION OF THE SEVERAL VIEWS OF THE DRAWINGS

FIGS. 4A to 4C are cross-sectional views of an electronic pen according to embodiment of the present disclosure and a side switch as the side attachment member;

DETAILED DESCRIPTION

Figure 1:
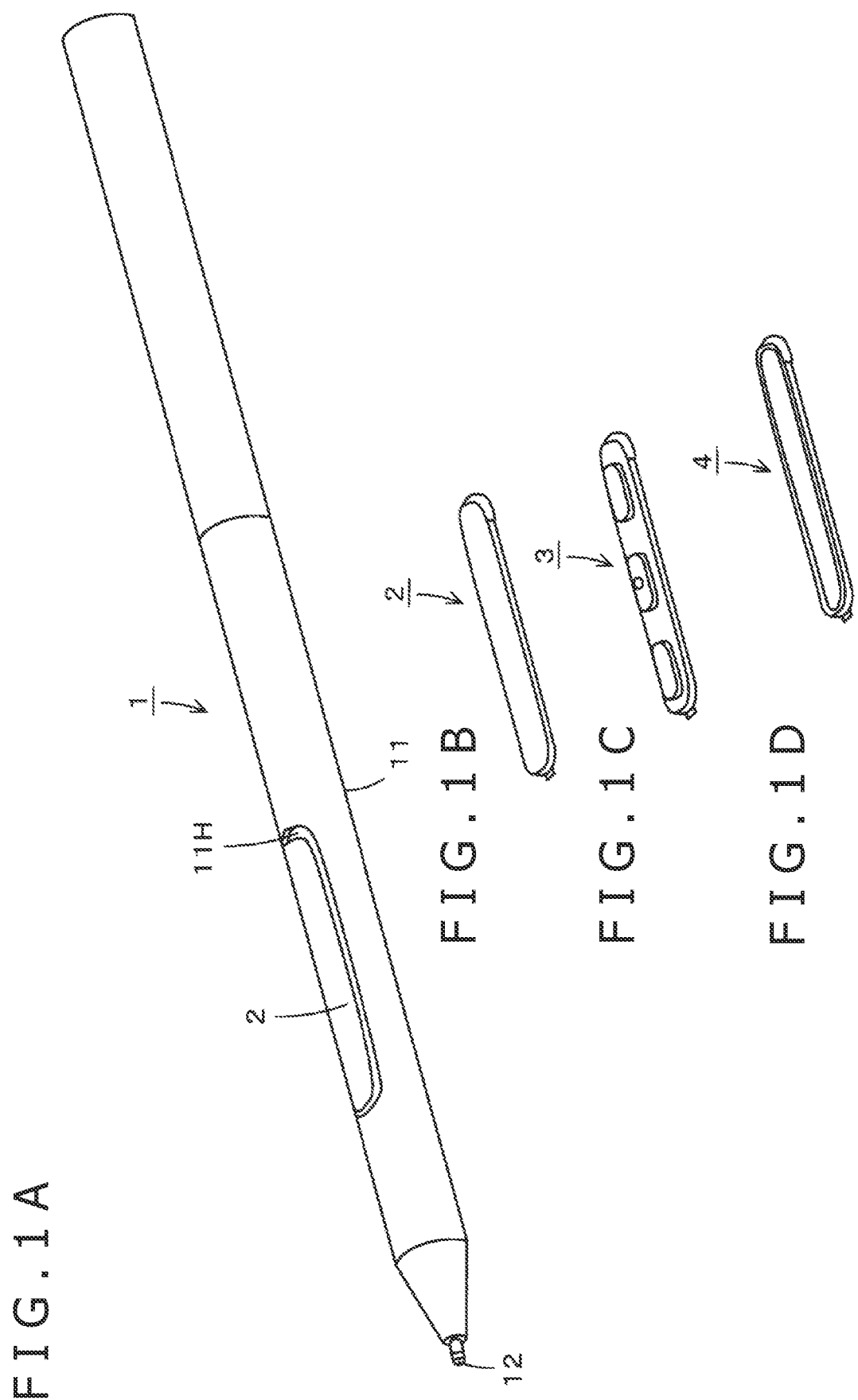
FIGS. 1A to 1D are views for describing the appearances of an electronic pen according to an embodiment of the present disclosure and side attachment members.

An electronic pen according to an embodiment of the present disclosure will be described below with reference to the drawings. There are electronic pens of various systems available, such as, for example, electronic pens of an electromagnetic induction system (electro magnetic resonance (EMR) system) and electronic pens of an active capacitive system (AES system). The present disclosure is applicable to electronic pens of any systems as long as the electronic pens include what is called side switches. To simplify the description, an example in which the present disclosure is applied to an electronic pen of the electromagnetic induction system will be described below.

Appearances of Electronic Pen and Side Attachment Members

FIGS. 1A to 1D are views for describing the appearances of an electronic pen 1 according to an embodiment of the present disclosure and side attachment members 2, 3, and 4. As illustrated in FIG. 1A, the electronic pen 1 includes a cylindrical housing 11. The cylindrical housing 11 is tapered on a pen tip side thereof and has an opening at a front end of the pen tip side. Inside the housing 11, a core body 12 which has a pen tip protruding from the opening at the front end of the housing 11 is mounted. As described in detail later, an electronic pen circuit that implements electronic pen functions is also mounted inside the housing 11. The electronic pen circuit includes, for example, a ferrite core, a coil, a pen pressure detector, and a circuit board.

Further, as illustrated in FIG. 1A, a side opening 11H is formed in a side surface of the housing 11 on the pen tip side. A side switch (side switch operation part) for pushing down switches provided on the circuit board mounted in the housing 11 is generally attached to the side opening 11H. However, in the electronic pen 1 according to the present embodiment, a plurality of types of side attachment members are available so as to be detachably attached to the side opening 11H of the housing 11. In the present embodiment, three types of side attachment members 2, 3, and 4 are detachably attachable, as illustrated in FIGS. 1B, 1C, and 1D.

The side attachment member 2 illustrated in FIG. 1B functions as a lid member that closes the side opening 11H of the housing 11. In the following description, the side attachment member 2 is referred to as a lid member 2. With the lid member 2 attached to the side opening 11H, the switches provided on the circuit board mounted in the housing 11 cannot be operated, and the side switch functions cannot be used.

The side attachment member 3 illustrated in FIG. 1C is a side switch including one or more push knobs (push buttons) and a plate part to which the push knobs are attached. In the following description, the side attachment member 3 is referred to as a side switch 3. With the side switch 3 attached to the side opening 11H, the switches provided on the circuit board mounted in the housing 11 can be operated, and the side switch functions can be used.

The side attachment member 4 illustrated in FIG. 1D is a touch sensor (touch sensor operation part) including a touch sensor of a capacitive system or a pressure sensitive system and a plate part on which the touch sensor is mounted. In the following description, the side attachment member 4 is referred to as a touch sensor 4. With the touch sensor 4 attached to the side opening 11H, the switches provided on the circuit board mounted in the housing 11 cannot be operated, but operation input can be performed through the touch sensor of the touch sensor 4.

In this way, the three types of side attachment members 2, 3, and 4 can easily be attached to and detached from the side opening 11H of the housing 11 of the electronic pen 1. Hence, a user of the electronic pen 1 can select an appropriate one from among the lid member 2, the side switch 3, and the touch sensor 4 while considering the type of input to be performed by using the electronic pen 1, attach the selected one to the electronic pen 1, and use the electronic pen 1.

Assume a case where the side attachment member attached to the side opening 11H of the housing 11 is detached to replace the side attachment member with another one. In this case, if the circuit board is exposed, the circuit board may be touched by the user or static electricity may be generated in the circuit board, any of which is undesirable. Hence, the electronic pen 1 according to the present embodiment includes a board protection member that protects the circuit board. Even though the electronic pen 1 according to the present embodiment includes the board protection member, the push switches on the circuit board can be pushed down reliably and appropriately via the side switch 3.

Example of Configuration of Side Switch 3

Figure 2:
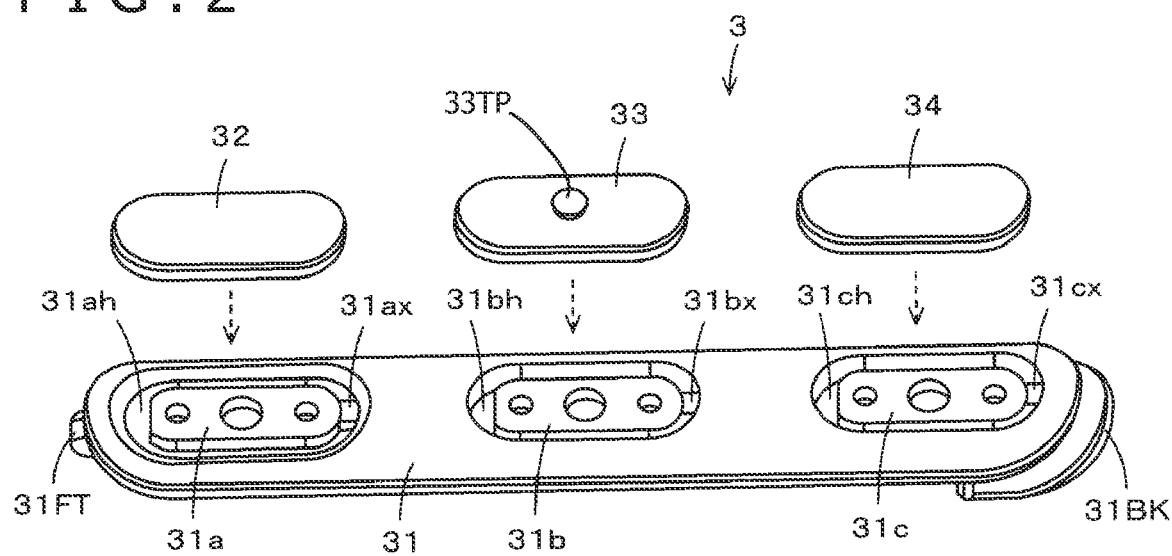
FIG. 2 is a view for describing an example of a configuration of a touch sensor according to an embodiment of the present disclosure.

FIG. 2 is a view for describing an example of a configuration of the side switch 3 as the side attachment member according to the present embodiment. As illustrated in FIGS. 1B, 1C, and 1D, the sizes (widths, lengths, and thicknesses) and outer edge shapes of the lid member 2, the side switch 3, and the touch sensor 4 are all the same. However, as described above, the lid member 2, the side switch 3, and the touch sensor 4 differ from each other in whether or not any function is mounted, and, if mounted, in the function that is mounted. Here, an example of the configuration of the side switch 3, which enables the use of the side switch functions, will be described.

As illustrated in FIG. 2, the side switch 3 includes a plate part 31 and three push knobs (operation buttons) of a first push knob 32, a second push knob 33, and a third push knob 34, which are attached to the plate part 31. Each of the first push knob 32, the second push knob 33, and the third push knob 34 is formed of, for example, hard rubber and includes an operation part having a substantially elliptical shape. A push protrusion is provided at the center (central portion) of a lower surface of the operation part, and attachment protrusions are provided on the front and back sides of the push protrusion. Note that the push protrusion and the attachment protrusions are not illustrated in FIG. 2 since they are provided on the lower surface of each of the first to third push knobs 32, 33, and 34.

Moreover, an operation surface protrusion 33TP is provided on an upper surface (operation surface) of the second push knob 33. Accordingly, by touching and checking the operation surface protrusion 33TP of the second push knob 33 with the user's finger, the user can recognize that the user is touching the second push knob 33 and that there are push knobs on the front and back sides of the second push knob 33, without looking at the side switch 3. In other words, the operation surface protrusion 33TP of the second push knob 33 enables the user to grasp the positions of the push knobs 32, 33, and 34 by touching and recognizing the operation surface protrusion 33TP with his/her finger without looking at the side switch 3.

The plate part 31 is formed by using any of various metal materials or various resin materials. Examples of the metal materials include brass, stainless steel, copper, and aluminum. Examples of the resin materials include a polyacetal resin (POM), a polyamide resin (PA), a polyethylene terephthalate resin (PET), a polycarbonate resin (PC), and an acrylonitrile butadiene styrene (ABS) resin. The plate part 31 includes a first attachment part 31a to which the first push knob 32 is attached, a second attachment part 31b to which the second push knob 33 is attached, and a third attachment part 31c to which the third push knob 34 is attached.

As illustrated in FIG. 2, the first attachment part 31a, the second attachment part 31b, and the third attachment part 31c are provided in a first plate opening 31ah, a second plate opening 31bh, and a third plate opening 31ch of the plate part 31, respectively. As illustrated in FIG. 2, each of the first attachment part 31a, the second attachment part 31b, and the third attachment part 31c includes a push protrusion hole in its central portion and small attachment holes on the front and back sides of the push protrusion hole. The push protrusion of the corresponding push knob is fitted into the push protrusion hole. The attachment protrusions of the corresponding push knob are fitted into the respective small attachment holes. Each of the first attachment part 31a, the second attachment part 31b, and the third attachment part 31c has a substantially rectangular shape. In the state in which the first push knob 32, the second push knob 33, and the third push knob 34 are attached to the first attachment part 31a, the second attachment part 31b, and the third attachment part 31c, respectively, the first push knob 32, the second push knob 33, and the third push knob 34 do not protrude from an upper surface of the plate part 31.

The first attachment part 31a is coupled to the plate part 31 via a first plate support part 31ax on the back end side (the right side of FIG. 2) of the first plate opening 31ah and is not in contact with the plate part 31 at the portions other than the first plate support part 31ax. Similarly, the second attachment part 31b is coupled to the plate part 31 via a second plate support part 31bx on the back end side of the second plate opening 31bh and is not in contact with the plate part 31 at the portions other than the second plate support part 31bx. Similarly, the third attachment part 31c is coupled to the plate part 31 via a third plate support part 31cx on the back end side of the third plate opening 31ch and is not in contact with the plate part 31 at the portions other than the third plate support part 31cx.

Therefore, when the first attachment part 31a, the second attachment part 31b, and the third attachment part 31c are pushed down from the upper surface side, the first attachment part 31a, the second attachment part 31b, and the third attachment part 31c are pushed downward with the first plate support part 31ax, the second plate support part 31bx, and the third plate support part 31cx serving as fulcrums, respectively. In this way, in the side switch 3, the first push knob 32 and the first attachment part 31a constitute a first push part, the second push knob 33 and the second attachment part 31b constitute a second push part, and the third push knob 34 and the third attachment part 31c constitute a third push part.

The plate part 31 illustrated in FIG. 2 has the same shape as the side opening 11H of the housing 11 of the electronic pen 1. Since the plate part 31 has a slightly smaller area than the side opening 11H, the plate part 31 fits inside the side opening 11H. That is, the plate part 31 is slightly smaller in width and overall length than the side opening 11H. In the present embodiment, the plate part 31 has such a thickness that the upper surface of the plate part 31 substantially matches the side surface of the housing 11 with the plate part 31 attached to the side opening 11H of the housing 11.

The plate part 31 illustrated in FIG. 2 includes a semi-cylindrical engagement part 31FT in the vicinity of a bottom surface of the plate part 31 on the pen tip side such that the semi-cylindrical engagement part 31FT protrudes toward the pen tip side. Further, a side surface of the plate part 31 on the back end side is formed as a pressed part 31BK. The engagement part 31FT of the plate part 31 engages with an inner wall surface of the housing 11. The pressed part 31BK of the plate part 31 is pressed toward the pen tip side by a pressing mechanism provided inside the housing 11.

The side switch 3, which is formed by attaching the first push knob 32, the second push knob 33, and the third push knob 34 to the plate part 31, is attached to the side opening 11H of the housing 11 in the following manner. First, the pen tip side (the engagement part 31FT side) of the side switch 3 is obliquely inserted so as to abut against an end portion of the side opening 11H of the housing 11 on the pen tip side. Next, the back end side (the pressed part 31BK side) is pushed down toward the side opening 11H. Accordingly, the engagement part 31FT engages with the inner wall surface of the housing 11, and the pressed part 31BK is pressed toward the pen tip side by the pressing mechanism inside the housing 11, so that the side switch 3 is attached to the side opening 11H of the housing 11.

The pressed part 31BK on the back end side of the side switch 3 has a stepped shape. Accordingly, when the pressed part 31BK, which protrudes toward the back end side, is pushed toward the back end side of the housing 11 to slidingly move the entire side switch 3 toward the back end side, the engagement part 31FT can be disengaged. Thus, the side switch 3 can not only easily be attached to the side opening 11H of the housing 11 but also easily be detached from the side opening 11H of the housing 11 when necessary.

Example of Configuration of Board Protection Member 18

Figure 3:
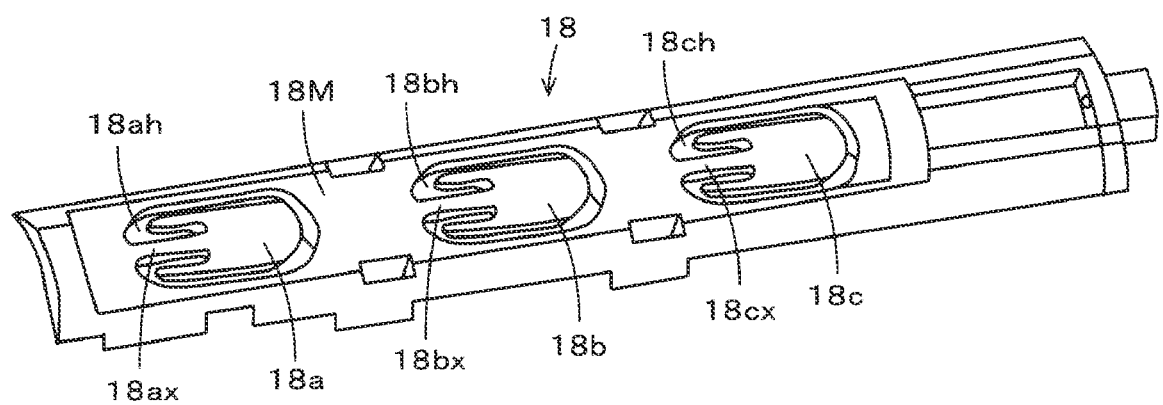
FIG. 3 is a view for describing an example of a configuration of a board protection member according to an embodiment of the present disclosure.

FIG. 3 is a view for describing an example of a configuration of a board protection member 18 according to the present embodiment. The board protection member 18, which is to be described in detail later, is provided in the housing 11 so as to cover a surface of a mounted circuit board 17 on which the push switches that implement the side switch functions are provided. The board protection member 18 prevents the circuit board from being exposed through the side opening 11H of the housing 11 even when the side attachment member 2, 3, or 4 is detached.

As illustrated in FIG. 3, the board protection member 18 has an inverted half-pipe shape whose lower side facing the circuit board has a large opening. The board protection member 18 is formed of, for example, a resin material. Note that any of various resins such as a polyacetal resin (POM), a polyamide resin (PA), a polyethylene terephthalate resin (PET), a polycarbonate resin (PC), and an ABS resin can be used as the resin material.

As illustrated in FIG. 3, the board protection member 18 includes a main body part 18M, a first depression part 18a, a second depression part 18b, and a third depression part 18c. As illustrated in FIG. 3, the first depression part 18a, the second depression part 18b, and the third depression part 18c are respectively provided in a first main body opening 18ah, a second main body opening 18bh, and a third main body opening 18ch which are formed in the main body part 18M. Further, although the details will be described later, each of the first depression part 18a, the second depression part 18b, and the third depression part 18c includes a depression protrusion at the center (central portion) of a lower surface thereof. Note that the depression protrusion is not illustrated in FIG. 3 since the depression protrusion is provided on each of the lower surfaces of the first depression part 18a, the second depression part 18b, and the third depression part 18c.

As illustrated in FIG. 3, the first depression part 18a is coupled to the main body part 18M via a first main body support part 18ax on the front end side (left side of FIG. 3) of the first main body opening 18ah and is not coupled to the main body part 18M at the portions other than the first main body support part 18ax. Similarly, the second depression part 18b is coupled to the main body part 18M via a second main body support part 18bx on the front end side of the second main body opening 18bh and is not in contact with the main body part 18M at the portions other than the second main body support part 18bx. Similarly, the third depression part 18c is coupled to the main body part 18M via a third main body support part 18cx on the front end side of the third main body opening 18ch and is not in contact with the main body part 18M at the portions other than the third main body support part 18cx.

When the first depression part 18a, the second depression part 18b, and the third depression part 18c are pushed down from the upper surface side in FIG. 3, the first depression part 18a, the second depression part 18b, and the third depression part 18c can be pushed downward (toward the circuit board) with the first main body support part 18ax, the second main body support part 18bx, and the third main body support part 18cx serving as fulcrums, respectively. In this way, as illustrated in FIG. 3, the first depression part 18a, the second depression part 18b, and the third depression part 18c of the board protection member 18 are coupled to the main body part 18M via the first to third main body support parts 18ax, 18bx, and 18cx, respectively, on the front end side (left side of FIG. 3). That is, this coupling mode is opposite the coupling mode in which the first to third attachment parts 31a, 31b, and 31c of the side switch 3 illustrated in FIG. 2 are coupled to the plate part 31 via the first to third plate support parts 31ax, 31bx, and 31cx, respectively, on the back end side (right side of FIG. 2).

The first attachment part 31a, the second attachment part 31b, and the third attachment part 31c of the side switch 3 have substantially the same size and shape as the first depression part 18a, the second depression part 18b, and the third depression part 18c of the board protection member 18. Further, in the electronic pen 1, the positions at which the first to third attachment parts 31a, 31b, and 31c of the side switch 3 are provided and the positions at which the first to third depression parts 18a, 18b, and 18c of the board protection member 18 are provided are the same in the direction intersecting the axial direction.

Accordingly, when the first push knob 32 of the side switch 3 is pushed down, the first attachment part 31a is pushed down, and the push protrusion of the first push knob 32 pushes down the first depression part 18a of the board protection member 18. Accordingly, a push switch SW1 on the circuit board is pushed down by the depression protrusion of the first depression part 18a, as described in detail later. Similarly, when the second push knob 33 of the side switch 3 is pushed down, the second attachment part 31b is pushed down, and the push protrusion of the second push knob 33 pushes down the second depression part 18b of the board protection member 18. Accordingly, a push switch SW2 on the circuit board is pushed down by the depression protrusion of the second depression part 18b, as described in detail later.

Similarly, when the third push knob 34 of the side switch 3 is pushed down, the third attachment part 31c is pushed down, and the push protrusion of the third push knob 34 pushes down the third depression part 18c of the board protection member 18. Accordingly, a push switch SW3 on the circuit board is pushed down by the depression protrusion of the third depression part 18c, as described in detail later. In this way, the first attachment part 31a, the second attachment part 31b, and the third attachment part 31c of the side switch 3 work together with the first depression part 18a, the second depression part 18b, and the third depression part 18c of the board protection member 18, respectively, when the respective knobs are pushed down. In this case, the first attachment part 31a, the second attachment part 31b, and the third attachment part 31c of the side switch 3 are coupled to the plate part 31 on the back end side. Further, the first depression part 18a, the second depression part 18b, and the third depression part 18c of the board protection member 18 are coupled to the main body part 18M on the front end side. This configuration is important for appropriate operation of the side switch functions.

Attachment and Detachment of Side Attachment Member to and from Electronic Pen

FIGS. 4A to 4C are cross-sectional views of the side switch 3 and the electronic pen 1 according to the present embodiment. Specifically, FIG. 4A is a cross-sectional view of the side switch 3 cut in half along the axial direction. As described above, and as also illustrated in FIG. 4A, the side switch 3 includes the plate part 31, the first push knob 32, the second push knob 33, and the third push knob 34. As illustrated in FIG. 2, the plate part 31 includes the first attachment part 31a, the second attachment part 31b, and the third attachment part 31c. The first push knob 32 is attached to the first attachment part 31a, the second push knob 33 is attached to the second attachment part 31b, and the third push knob 34 is attached to the third attachment part 31c on the plate part 31, thereby constituting the side switch 3.

As illustrated in FIG. 4A, the first push knob 32 includes a push protrusion 32P in a central portion of a lower surface of the first push knob 32 and also includes attachment protrusions on the front and back sides of the push protrusion 32P. Similarly, the second push knob 33 includes a push protrusion 33P in a central portion of a lower surface of the second push knob 33 and also includes attachment protrusions on the front and back sides of the push protrusion 33P. Further, the third push knob 34 includes a push protrusion 34P in a central portion of a lower surface of the third push knob 34 and also includes attachment protrusions on the front and back sides of the push protrusion 34P. The first push knob 32 is attached to the first attachment part 31a such that the push protrusion 32P is fitted into the push protrusion hole of the first attachment part 31a and the attachment protrusions on the front and back sides of the push protrusion 32P are fitted into the respective attachment holes on the front and back sides of the push protrusion hole of the first attachment part 31a. Similarly, the second push knob 33 is attached to the second attachment part 31b such that the push protrusion 33P is fitted into the push protrusion hole of the second attachment part 31b and the attachment protrusions on the front and back sides of the push protrusion 33P are fitted into the respective attachment holes on the front and back sides of the push protrusion hole of the second attachment part 31b. Similarly, the third push knob 34 is attached to the third attachment part 31c such that the push protrusion 34P is fitted into the push protrusion hole of the third attachment part 31c and the attachment protrusions on the front and back sides of the push protrusion 34P are fitted into the respective attachment holes on the front and back sides of the push protrusion hole of the third attachment part 31c.

As illustrated in FIG. 4A, with the first push knob 32 attached to the first attachment part 31a, the push protrusion 32P of the first push knob 32 protrudes from a lower surface of the first attachment part 31a. Similarly, with the second push knob 33 attached to the second attachment part 31b, the push protrusion 33P of the second push knob 33 protrudes from a lower surface of the second attachment part 31b. Similarly, with the third push knob 34 attached to the third attachment part 31c, the push protrusion 34P of the third push knob 34 protrudes from a lower surface of the third attachment part 31c.

As described with reference to FIG. 2, the first attachment part 31a, which is provided in the first plate opening 31ah, is coupled to the plate part 31 via the first plate support part 31ax and is not coupled to the plate part 31 at the portions other than the first plate support part 31ax. Similarly, the second attachment part 31b, which is provided in the second plate opening 31bh, is coupled to the plate part 31 via the second plate support part 31bx and is not coupled to the plate part 31 at the portions other than the second plate support part 31bx. Similarly, the third attachment part 31c, which is provided in the third plate opening 31ch, is coupled to the plate part 31 via the third plate support part 31cx and is not coupled to the plate part 31 at the portions other than the third plate support part 31cx.

Thus, when the first push knob 32 is pushed down, the first push knob 32 and the first attachment part 31a are pushed down together from the pen tip side opposite to the first plate support part 31ax. Similarly, when the second push knob 33 is pushed down, the second push knob 33 and the second attachment part 31b are pushed down together from the pen tip side. Similarly, when the third push knob 34 is pushed down, the third push knob 34 and the third attachment part 31c are pushed down together from the pen tip side.

In the present embodiment, at least the thickness of the first push knob 32 is smaller than the thickness of the second push knob 33 and the thickness of the third push knob 34. Further, as described above, the operation surface protrusion 33TP is provided on the upper surface of the operation part of the second push knob 33. With the thicknesses of these push knobs 32, 33, and 34 and the operation surface protrusion 33TP of the second push knob 33, the user can recognize which push knob his or her finger is touching. Accordingly, the user can appropriately push down any of the push knobs 32, 33, and 34 that the user desires, without looking at the side switch 3. Note that the push knobs 32, 33, and 34 may all have different thicknesses or the same thickness.

As described with reference to FIG. 2 and also illustrated in FIG. 4A, the engagement part 31FT is provided at a front end of the plate part 31 on the pen tip side, while the pressed part 31BK is provided at a back end of the plate part 31. Moreover, on the plate part 31, a metal plate (metal piece) 35 is fixed between the second attachment part 31b and the third attachment part 31c. The metal plate 35, together with a magnet, which is to be described later, provided inside the housing 11, functions as a positioning part that allows the side switch 3 to be attached to an appropriate portion of the housing 11 when the side switch 3 is attached to the side opening 11H of the housing 11. The metal plate 35, together with the magnet, which is to be described later, provided inside the housing 11, also functions as a holding part that prevents the side switch 3 from easily being detached from the side opening 11H of the housing 11.

FIG. 4B is a cross-sectional view of the electronic pen 1 when the side switch 3 is not attached to the side opening 11H of the housing 11. Specifically, FIG. 4B is a cross-sectional view of a portion from the pen tip to the vicinity of a central portion of the electronic pen 1 when the electronic pen 1 is cut in half along the axial direction. Accordingly, the cross-sectional view illustrated in FIG. 4B includes the entire side opening 11H from the pen tip but omits a portion on the back end side. As described above, the electronic pen circuit is mounted inside the housing 11. Specifically, as illustrated in FIG. 4B, the core body 12 is inserted from its back end into the opening on the tapered pen tip side of the housing 11. The core body 12 is then inserted through a pipe-shaped ferrite core 13 and attached to a pen pressure detector 15. A coil 14 which constitutes a resonant circuit together with a capacitor mounted on the circuit board 17 to be described later is wound around a side surface of the ferrite core 13.

The pen tip of the core body 12 protrudes from the opening at the front end of the tapered portion of the housing 11. The core body 12 slidingly moves in the axial direction according to a pen pressure applied to the pen tip. That is, when the pen pressure is applied, the core body 12 is pushed into the housing 11 and moves toward the pen pressure detector 15, and when the pen pressure is released, the core body 12 is pushed back to its original position. In the present embodiment, the pen pressure detector 15 is configured as a variable capacitor and detects a pen pressure according to the capacitance that changes according to the pen pressure applied to the core body 12.

The circuit board 17 on which various circuit components such as the push switches SW1, SW2, and SW3, the capacitor, and a control integrated circuit (IC) that implement the side switch functions are mounted is provided at a subsequent stage of the pen pressure detector 15. The circuit board 17 is mounted on a half-pipe-shaped board holding member 16 whose upper side facing the circuit board 17 has an opening, so that the position of the circuit board 17 within the housing 11 is fixed. Further, the board holding member 16 is fixed inside the housing 11. Further, as described above, the board protection member 18, which has an inverted half-pipe shape whose lower side facing the circuit board 17 has an opening, is provided on the upper side of the circuit board 17, so that the circuit board 17 cannot directly be touched from the side opening 11H of the housing 11.

The first depression part 18a is provided at a portion of the board protection member 18 that faces the first attachment part 31a of the plate part 31 of the side switch 3 when the side switch 3 is attached to the side opening 11H. Further, in this case, the second depression part 18b is provided at a portion of the board protection member 18 that faces the second attachment part 31b of the plate part 31. Further, the third depression part 18c is provided at a portion of the board protection member 18 that faces the third attachment part 31c of the plate part 31.

A depression protrusion 18aP is provided at the center on the lower side of the first depression part 18a and can push down the switch SW1 of the circuit board 17. Similarly, a depression protrusion 18bP is provided at the center on the lower side of the second depression part 18b and can push down the switch SW2 of the circuit board 17. Similarly, a depression protrusion 18cP is provided at the center on the lower side of the third depression part 18c and can push down the switch SW3 of the circuit board 17.

Further, as described above with reference to FIG. 3, the first depression part 18a of the board protection member 18 is provided in the first main body opening 18ah. The first depression part 18a is coupled to the main body part 18M via the first main body support part 18ax and is not coupled to the main body part 18M at the portions other than the first main body support part 18ax. Similarly, the second depression part 18b of the board protection member 18 is provided in the second main body opening 18bh. The second depression part 18b is coupled to the main body part 18M via the second main body support part 18bx and is not coupled to the main body part 18M at the portions other than the second main body support part 18bx. Similarly, the third depression part 18c of the board protection member 18 is provided in the third main body opening 18ch. The third depression part 18c is coupled to the main body part 18M via the third main body support part 18cx and is not coupled to the main body part 18M at the portions other than the third main body support part 18cx.

A magnet 19 is fixed at a position on the pen tip side of the third main body support part 18cx. The magnet 19 attracts the metal plate 35 of the side switch 3 described above and functions not only as a positioning part for positioning the side switch 3, but also as a holding part that holds the side switch 3 in the side opening 11H.

A pressing mechanism 70 which presses the pressed part 31BK of the side switch 3 is provided on the upper surface of the board protection member 18 on the back end side. The pressing mechanism 70 includes a pressing member 71 and a coil spring 72 which is an elastic member. The position of the pressing member 71 is restricted such that the pressing member 71 does not protrude toward the pen tip side more than necessary and is not pushed toward the back end side more than necessary. The pressing member 71 is urged toward the pen tip side at all times by the coil spring 72, but when the pressing member 71 is pushed toward the back end side, the coil spring 72 contracts, so that the pressing member 71 can slidingly move toward the back end side.

FIG. 4C is a cross-sectional view of the electronic pen 1 when the side switch 3 is attached to the side opening 11H of the housing 11. Specifically, FIG. 4C is an enlarged view mainly illustrating the side opening 11H when the electronic pen 1 is cut in half along the axial direction. To attach the side switch 3 illustrated in FIG. 4A to the electronic pen 1, the side switch 3 is tilted diagonally with the pen tip side down, the engagement part 31FT is inserted into a gap gp, which is illustrated in FIG. 4B, between the board protection member 18 and the housing 11, and the back end of the side switch 3 is pushed toward the side opening 11H.

In this case, the engagement part 31FT of the side switch 3 engages with the inner wall surface of the housing 11 in the gap gp on the pen tip side of the side opening 11H. Further, the pressed part 31BK of the side switch 3 at the back end is pressed toward the pen tip side by the pressing member 71 of the pressing mechanism 70, which is provided on the back end side of the board protection member 18. Further, the metal plate 35 of the side switch 3 is attracted to the magnet 19 of the board protection member 18. These three functions work such that the side switch 3 is attached to the appropriate position in the side opening 11H of the housing 11 of the electronic pen 1 and is not detached easily therefrom.

With the side switch 3 attached to the side opening 11H, the first plate opening 31ah of the side switch 3 and the first main body opening 18ah of the board protection member 18 are at the positions vertically corresponding to each other. Similarly, the second plate opening 31bh of the side switch 3 and the second main body opening 18bh of the board protection member 18 are at the positions vertically corresponding to each other. Similarly, the third plate opening 31ch of the side switch 3 and the third main body opening 18ch of the board protection member 18 are at the positions vertically corresponding to each other.

Thus, as illustrated in FIG. 4C, with the side switch 3 attached to the side opening 11H, the first push knob 32 attached to the first attachment part 31a of the side switch 3 and the first depression part 18a of the board protection member 18 are at the positions vertically corresponding to each other. Similarly, the second push knob 33 attached to the second attachment part 31b of the side switch 3 and the second depression part 18b of the board protection member 18 are at the positions vertically corresponding to each other. Further, the third push knob 34 attached to the third attachment part 31c of the side switch 3 and the third depression part 18c of the board protection member 18 are at the positions vertically corresponding to each other.

Assume that the first push knob 32 of the side switch 3 is pushed down. In this case, the push protrusion 32P of the first push knob 32 pushes down the first depression part 18*a* of the board protection member 18. Accordingly, the depression protrusion 18*a*P of the first depression part 18*a* pushes down the switch SW1 on the circuit board 17. Similarly, assume that the second push knob 33 of the side switch 3 is pushed down. In this case, the push protrusion 33P of the second push knob 33 pushes down the second depression part 18*b* of the board protection member 18. Accordingly, the depression protrusion 18*b*P of the second depression part 18*b* pushes down the switch SW2 on the circuit board 17. Similarly, assume that the third push knob 34 of the side switch 3 is pushed down. In this case, the push protrusion 34P of the third push knob 34 pushes down the third depression part 18*c* of the board protection member 18. Accordingly, the depression protrusion 18*c*P of the third depression part 18*c* pushes down the switch SW3 on the circuit board 17.

Figure 5:
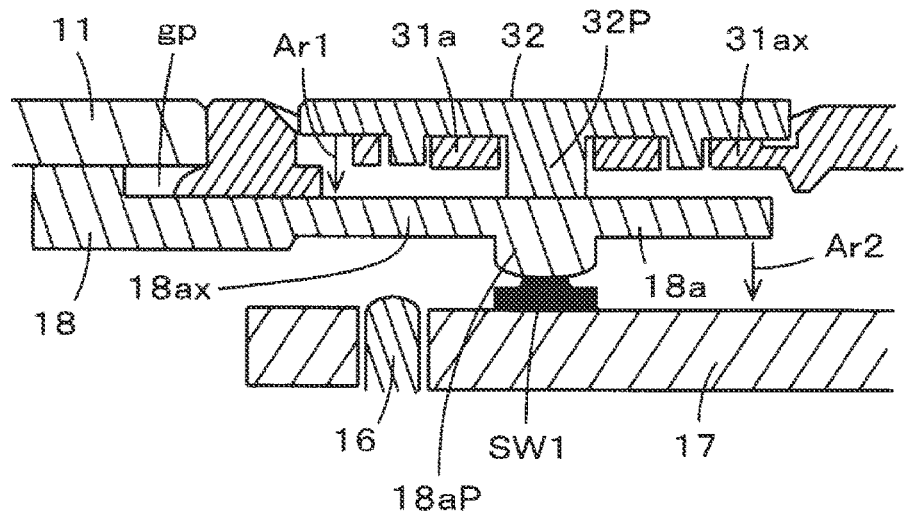
FIG. 5 is a cross-sectional view for describing a relation among a push switch on a circuit board of an electronic pen according to an embodiment of the present disclosure, a depression part of the board protection member, and a push knob of the side switch.
Figure 6A:
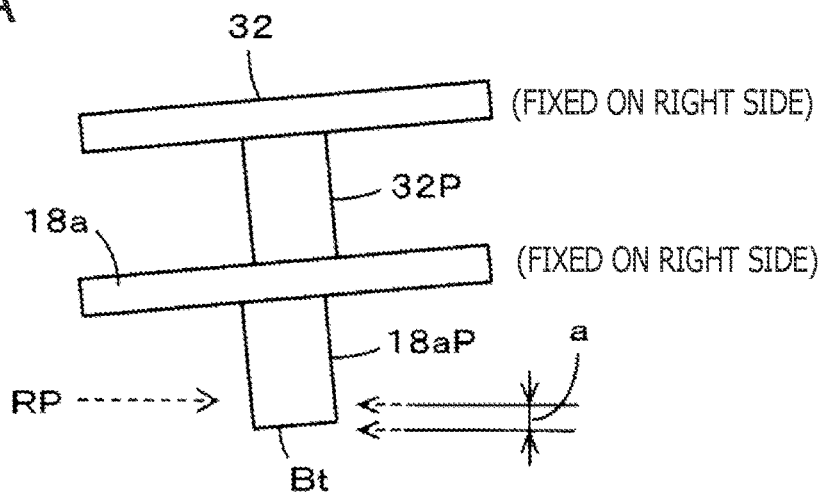
FIGS. 6A and 6B are views for describing a state when the depression part of the board protection member and the push knob of the side switch of an electronic pen according to an embodiment unit are operated.
Figure 6B:
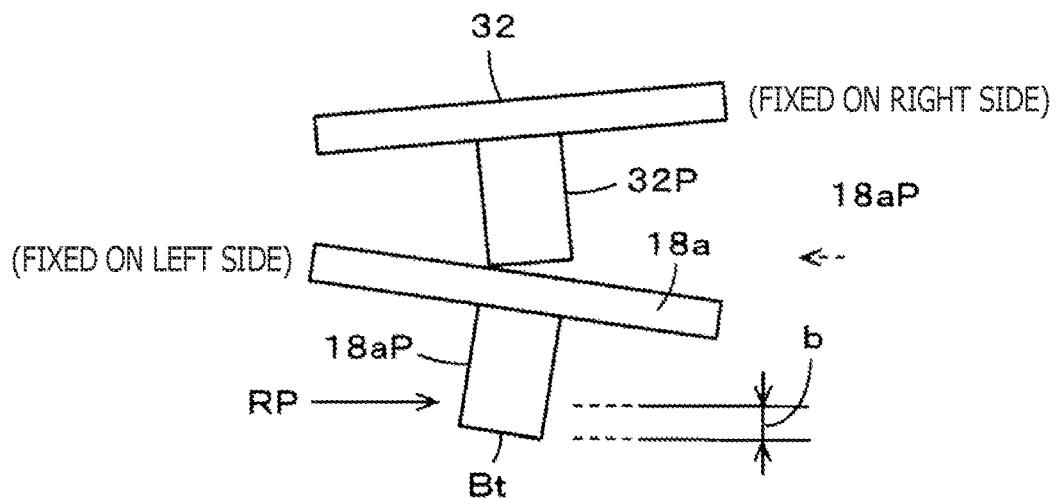

FIG. 5 is a cross-sectional view for describing a relation among the push switch SW1 on the circuit board 17 of the electronic pen 1 according to the present embodiment, the first depression part 18*a* of the board protection member 18, and the first push knob 32 of the side switch 3. Specifically, FIG. 5 is an enlarged view of a portion of FIG. 4C where the first push knob 32 is located. FIGS. 6A and 6B are views for describing a state when the first depression part 18*a* of the board protection member 18 and the first push knob 32 of the side switch 3 of the electronic pen 1 according to the present embodiment are operated.

As described with reference to FIGS. 2 and 4A, the first push knob 32 is attached to the first attachment part 31*a* of the side switch 3. The push protrusion 32P of the first push knob 32 protrudes from the lower surface of the first attachment part 31*a* and is in contact with the upper surface of the first depression part 18*a* of the board protection member 18. Note that the first attachment part 31*a* is coupled to the plate part 31 at the first plate support part 31*ax* on the back end side (right side of FIG. 5) and is not coupled to the plate part 31 at the portions other than the first plate support part 31*ax*. In this way, the first attachment part 31*a* is coupled to the plate part 31 on the back end side (right side of FIG. 5) and has what is called a cantilever beam structure that is fixed on the right side. Hence, when the first push knob 32 is pushed down, the first push knob 32 and the first attachment part 31*a* are pushed downward from the front end side (left side of FIG. 5) as indicated by an arrow Ar1.

As described with reference to FIGS. 4B and 4C, the first depression part 18*a* of the board protection member 18 includes the depression protrusion 18*a*P, which protrudes from the lower surface of the first depression part 18*a* toward the circuit board 17 and is in contact with the switch SW1 on the circuit board 17. The first depression part 18*a* of the board protection member 18 is coupled to the main body part 18M at the first main body support part 18*ax* on the front end side (left side of FIG. 5) and is not coupled to the main body part 18M at the portions other than the first main body support part 18*ax*. In this way, the first depression part 18*a* is coupled to the main body part 18M on the front end side (left side of FIG. 5) and has what is called a cantilever beam structure that is fixed on the left side. Hence, when the first depression part 18*a* is pushed down, the first depression part 18*a* is pushed downward from the back end side (right side of FIG. 5) as indicated by an arrow Ar2.

For example, assume a case where the first attachment part 31*a* to which the first push knob 32 is attached is coupled to the plate part 31 on the back end side (right side of FIG. 5) and where the first depression part 18*a* of the board protection member 18 is also coupled to the main body part 18M of the board protection member 18 on the back end side (right side of FIG. 5). In this case, as illustrated in FIG. 6A, when the first push knob 32 is pushed down, both the first push knob 32 and the first depression part 18*a* of the board protection member 18 are pushed down on the left side. Thus, as illustrated in FIG. 6A, a bottom surface Bt of the depression protrusion 18*a*P at an initial position RP is pushed down only by a distance a.

On the other hand, in the case of the electronic pen 1 according to the present embodiment, when the first push knob 32 is pushed down, the first push knob 32 and the first depression part 18*a* are pushed down alternately as illustrated in FIG. 6B. In this case, as illustrated in FIG. 6B, the bottom surface Bt of the depression protrusion 18*a*P at the initial position RP can be pushed down by a distance b which is larger than the distance a. This similarly applies to the second push knob 33 of the side switch 3 and the second depression part 18*b* of the board protection member 18 as well as the third push knob 34 of the side switch 3 and the third depression part 18*c* of the board protection member 18 as they have a similar configuration to the first push knob 32 of the side switch 3 and the first depression part 18*a* of the board protection member 18.

That is, in the electronic pen 1 according to the present embodiment, the first to third push knobs 32, 33, and 34 have a cantilever beam structure that is fixed on the right side, while the first to third depression parts 18*a*, 18*b*, and 18*c* of the board protection member 18 have a cantilever beam structure that is fixed on the left side. Hence, when any of the first to third push knobs 32, 33, and 34 is pushed down, the push knob and the corresponding depression part are pushed down alternately on the left and right sides, respectively. As a result, the depression protrusions 18*a*P, 18*b*P, and 18*c*P of the first to third depression parts 18*a*, 18*b*, and 18*c* of the board protection member 18 can be pushed downward further than the case where coupling is made on the same side (FIG. 6A). With this configuration, the side switch operation can be performed reliably and appropriately.

To detach the side switch 3 attached to the side opening 11H of the housing 11 of the electronic pen 1, the user touches the upper surface of the side switch 3 with his/her finger and pushes the upper surface up toward the back end side of the electronic pen 1. This causes the side switch 3 to slidingly move toward the back end side of the electronic pen 1. In this case, the side switch 3 slidingly moves to the back end side of the electronic pen 1 together with the pressing member 71 of the pressing mechanism 70, so that the inner wall surface of the housing 11 at an end of the side opening 11H on the pen tip side and the engagement part 31FT of the side switch 3 on the pen tip side are disengaged from each other.

Accordingly, since the pen tip side of the side switch 3 can be separated from the housing 11 of the electronic pen 1, the user can lift up the pen tip side of the side switch 3. In this case, the metal plate 35 of the side switch 3 is separated from the magnet 19 of the board protection member 18, and the pressing of the pressing member 71 of the pressing mechanism 70 against the pressed part 31BK of the side switch 3 is also released. In this way, the side switch 3 can easily be detached from the side opening 11H. Although the case where the side switch 3 is detachably attached to the side opening 11H of the housing 11 of the electronic pen 1 has been described as an example, the lid member 2 and the touch sensor 4 as the side attachment members can similarly be detachably attached to the side opening 11H.

Attachment of Grip Member

As illustrated in FIG. 1, the electronic pen 1 according to the present embodiment has a thin shaft as a whole. For this reason, some users may want to increase the thickness of the shaft of the electronic pen 1 that they grip in their hands. Hence, it is considered that a retrofit grip member that makes the shaft of the electronic pen 1 thicker is attached to the electronic pen 1. In this case, the problem arises when a side attachment member such as the side switch is attached. In other words, just providing a side opening on the retrofit grip member cannot make the side switch functions appropriately used since the thickness of the grip member becomes an obstacle. Thus, side attachment members such as the side switch that correspond to the retrofit grip member are made available.

Figure 7A:
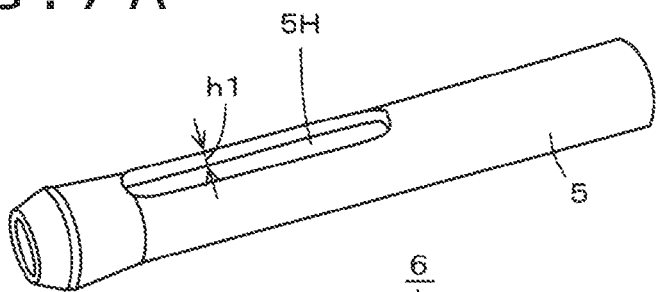
FIGS. 7A to 7C are views for describing an example of a grip member which can be attached to an electronic pen according to an embodiment of the present disclosure, and a side attachment member which can be attached and used with the grip member attached to the electronic pen.
Figure 7B:
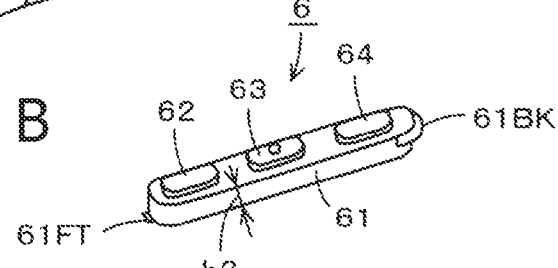
Figure 7C:
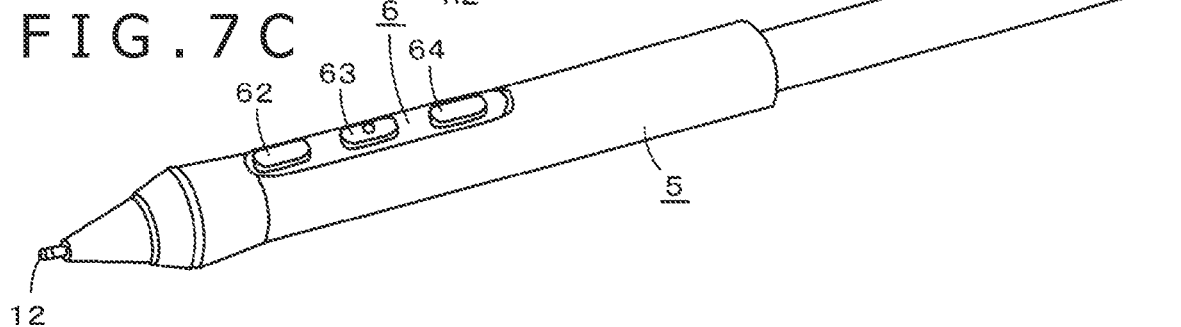

FIGS. 7A to 7C are views for describing an example of a grip member 5 which can be attached to the electronic pen 1 according to the present embodiment, and a side attachment member 6 which can be attached and used with the grip member 5 attached to the electronic pen 1. The side attachment member 6 illustrated in FIGS. 7B and 7C is an example of the side switch and referred to as a side switch 6 in the following description. As illustrated in FIG. 7A, the retrofit grip member 5 has a cylindrical body with a front end surface and a back end surface open. The grip member 5 includes a side opening 5H such that, when the grip member 5 is attached to the electronic pen 1, the side opening 5H matches the side opening 11H of the housing 11 of the electronic pen 1. The thickness of the grip member 5 in the direction orthogonal to the axial direction is a thickness h1 as illustrated in FIG. 7A, and the thickness of the shaft of the electronic pen 1 can be increased by this thickness h1.

A basic configuration of the side switch 6 used together with the grip member 5 is similar to that of the side switch 3 described with reference to FIGS. 2 and 4A. Thus, as illustrated in FIG. 7B, the side switch 6 includes a plate part 61, a first push knob 62, a second push knob 63, and a third push knob 64. An engagement part 61FT which corresponds to the engagement part 31FT of the side switch 3 is provided on the bottom surface side of the front end surface of the side switch 6. A pressed part 61BK which corresponds to the pressed part 31BK of the side switch 3 is provided on the bottom surface side of the back end surface of the side switch 6. The thickness of the plate part 61 (the thickness in the direction intersecting the axial direction) is a thickness h2 which is the sum of the thickness of the housing 11 of the electronic pen 1 and the thickness h1 of the grip member 5.

The plate part 61 according to this example also has a similar configuration to the plate part 31 illustrated in FIG. 2. That is, although not illustrated, the plate part 61 includes a first attachment part, a second attachment part, and a third attachment part. In this example as well, the first attachment part is coupled to the plate part 61 via a first plate support part. The second attachment part is coupled to the plate part 61 via a second plate support part. The third attachment part is coupled to the plate part 61 via a third plate support part. The first attachment part, the second attachment part, and the third attachment part are not coupled to the plate part 61 other than the portions coupled to the plate part 61 via the first plate support part, the second plate support part, and the third plate support part, respectively. The thicknesses of the first attachment part, the second attachment part, and the third attachment part are basically the same as those of the first attachment part 31a, the second attachment part 31b, and the third attachment part 31c illustrated in FIG. 2.

However, at least push protrusions which are provided at central portions of lower surfaces of the respective first push knob 62, second push knob 63, and third push knob 64 have a length corresponding to the thickness h2 of the plate part 61. Accordingly, as illustrated in FIG. 7C, assume that the grip member 5 is attached to the electronic pen 1 with the side opening 11H of the housing 11 and the side opening 5H of the grip member 5 aligned and that the side switch 6 is attached to the electronic pen 1. In this case, the push protrusions, which are provided at the central portions of the lower surfaces of the respective first push knob 62, second push knob 63, and third push knob 64 of the side switch 6, are respectively in contact with the central portions of the first depression part 18a, the second depression part 18b, and the third depression part 18c of the board protection member 18 in the mode illustrated in FIG. 4C.

Figure 8:
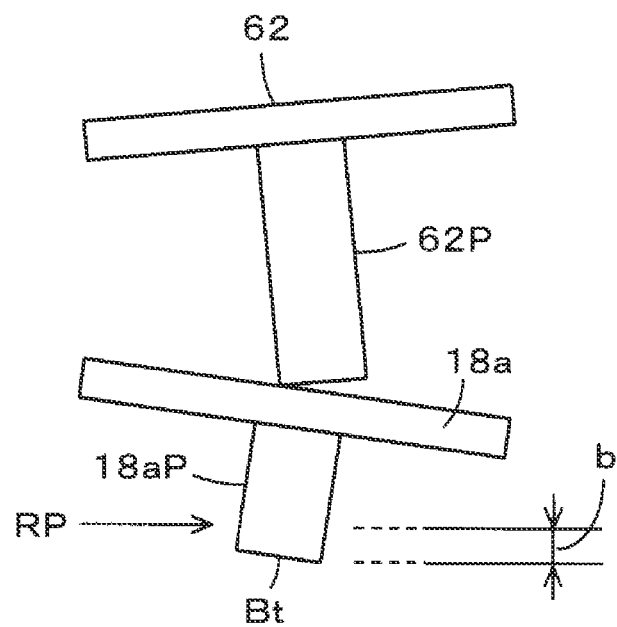
FIG. 8 is a view for describing a state when the depression part of the board protection member of an electronic pen according to an embodiment of the present disclosure and a push knob of a side switch illustrated in FIGS. 7B and 7C are operated.

FIG. 8 is a view for describing a state when the first depression part 18a of the board protection member 18 of the electronic pen 1 according to the present embodiment and the first push knob 62 of the side switch 6 illustrated in FIGS. 7B and 7C are operated. In this example, as in the case of the example illustrated in FIG. 6B, when the first push knob 62 of the side switch 6 is pushed down, the first push knob 62 and the first depression part 18a of the board protection member 18 are pushed down alternately on the left and right sides, respectively, as illustrated in FIG. 8. In this case, as illustrated in FIG. 8, the bottom surface Bt of the depression protrusion 18aP at the initial position RP can be pushed down by the distance b, as with the example illustrated in FIG. 6B.

That is, although the push protrusion 62P of the first push knob 62 has an increased length, the depression protrusion 18aP of the first depression part 18a of the board protection member 18 can reliably push down the switch SW1 of the circuit board 17, as with the case illustrated in FIG. 6B. This similarly applies to the second push knob 63 of the side switch 6 and the second depression part 18b of the board protection member 18 as well as the third push knob 64 of the side switch 6 and the third depression part 18c of the board protection member 18 as they have a similar configuration to the first push knob 62 of the side switch 6 and the first depression part 18a of the board protection member 18.

As a result, it is possible to realize an electronic pen that has a shaft with an increased thickness and that enables the use of the side switch functions without any trouble, by attaching the grip member 5 to the electronic pen 1 and further attaching the side switch 6 thereto. Note that the grip member 5 is not limited to the one illustrated in FIG. 7A, and any of grip members of various designs that can be attached to the shaft of the electronic pen 1 can be used as the grip member 5. Moreover, the grip member 5 can be formed by using any of various elastomers that are elastic polymeric materials such as natural rubber and synthetic rubber or can be formed by using any of various materials such as metal, wood, and a hard resin.

Note that the case where the side switch 6 is used as the side attachment member has been described here as an example. However, the lid member and the touch sensor can also have an increased thickness in the direction intersecting the axial direction, as with the side switch 6. In this case, the lid member and the touch sensor are configured so as to correspond to the retrofit grip member 5. If a retrofit grip member without a side opening is configured and attached to the electronic pen 1, the side switch function can be disabled, as with the case where the lid member 2 is attached to the electronic pen 1.

Advantageous Effects of Embodiment

In the case of the electronic pen 1 according to the present embodiment described above, although the side switch 3 or 6 is detachably attachable, the board protection member 18 is provided on the circuit board 17, so that the circuit board 17 is not exposed from the side opening 11H. This configuration can appropriately protect the circuit board 17, which is mounted in the electronic pen 1.

Moreover, since the positions at which the support parts serving as beams are coupled are opposite between the first to third push knobs 32, 33, and 34 of the side switch 3 and the first to third depression parts 18a, 18b, and 18c of the board protection member 18, the push knobs and the corresponding depression parts are pushed down alternately on the left and right sides, respectively. Accordingly, even with the same amount of pushing, the depression protrusions can be pushed downward further than the case where the positions at which the support parts serving as beams are coupled are the same between the first to third push knobs 32, 33, and 34 and the first to third depression parts 18a, 18b, and 18c, and the push switches SW1, SW2, and SW3 of the circuit board 17 can be pushed down reliably and appropriately.

Moreover, even when the grip member 5 is attached to change the thickness of the shaft of the electronic pen 1, it is possible to realize an electronic pen having the side switch functions that allow the pushing operation to be performed reliably and appropriately as with the case where the grip member 5 is not attached.

Modifications

In the embodiment described above, the side switch 3 includes the three push knobs 32, 33, and 34, and the side switch 6 includes the three push knobs 62, 63, and 64. However, the present disclosure is not limited thereto. The number of push knobs of the side switch can be set to an appropriate number within an operable range. For example, the number of push knobs may be one or two. In this case, the circuit board 17 of the electronic pen 1 may include as many switches as the push knobs of the side switch. Alternatively, the circuit board 17 may include one or two switches among the three switches SW1, SW2, and SW3.

When the side switch includes two push knobs, an operation surface protrusion may be provided on an operation surface of one of the push knobs, so that the user can recognize which push knob his/her finger is touching. Alternatively, when the side switch includes two push knobs, the push knobs may have different thicknesses, so that the user can recognize which push knob his/her finger is touching.

Further, in the embodiment described above, the first to third attachment parts 31a, 31b, and 31c of the side switch 3 are cantilever beams that are fixed on the right side, while the first to third depression parts 18a, 18b, and 18c of the board protection member 18 are cantilever beams that are fixed on the left side. However, the configuration may be the other way around. That is, the first to third attachment parts 31a, 31b, and 31c of the side switch 3 may be cantilever beams that are fixed on the left side, while the first to third depression parts 18a, 18b, and 18c of the board protection member 18 may be cantilever beams that are fixed on the right side.

Further, the first attachment part 31a of the side switch 3 is a cantilever beam that is fixed on the right side, while the first depression part 18a of the board protection member 18 is a cantilever beam that is fixed on the left side. Further, the second attachment part 31b of the side switch 3 is a cantilever beam that is fixed on the left side, while the second depression part 18b of the board protection member 18 is a cantilever beam that is fixed on the right side. In this way, the direction in which the first to third attachment parts 31a, 31b, and 31c of the side switch 3 are coupled to the plate part 31 only needs to be different from the direction in which the corresponding first to third depression parts 18a, 18b, and 18c of the board protection member 18 are coupled to the main body part 18M.

Further, in the embodiment described above, in the side switch 3, the first to third push knobs 32, 33, and 34 are respectively attached to the first to third attachment parts 31a, 31b, and 31c of the plate part 31 to constitute the first to third push parts. However, the present disclosure is not limited thereto. For example, each of the first to third attachment parts 31a, 31b, and 31c of the plate part 31 may have an increased thickness and include a push protrusion at the central portion of the lower surface to constitute a push part integrally including a push knob and an attachment part. Further, for example, the plate part 31 may be formed by using plastic, and the push knobs may be formed by using elastomer, to constitute the side switch 3 including the push parts by what is called double-color molding (double molding).

Further, the lid member 2, the side switches 3 and 6, and the touch sensor 4 can have various sizes depending on the size of the side opening 11H, which is provided in the housing 11 of the electronic pen 1.

Further, in the embodiment described above, the operation surface protrusion 33TP is provided on the operation surface of the second push knob 33 of the side switch 3. However, the present disclosure is not limited thereto. The operation surface protrusion 33TP may be omitted or may be provided on an operation surface of a push knob other than the second push knob 33.

Further, in the embodiment described above, the side switch 3 includes the metal plate 35, and the board protection member 18 includes the magnet 19 at the position corresponding to the metal plate 35. However, the present disclosure is not limited thereto. The side switch 3 may include a plurality of metal plates, and the board protection member 18 may include magnets at the positions corresponding to the respective ones of the metal plates of the side switch 3.

Further, since the plate parts 31 and 61 of the side switches 3 and 6 can be formed by using any of various metal materials, the weight can be changed depending on the type of metal material. Accordingly, in order to realize the electronic pen 1 with what is called a low center of gravity, the electronic pen 1 can include the side switch 3 in which the plate part 31 is formed by using a heavy metal material. Further, in order to realize the electronic pen 1 that is lightweight overall, the electronic pen 1 can include the side switch 3 in which the plate part 31 is formed by using a lightweight metal material.

Since the side attachment members such as the lid member 2, the side switch 3, and the touch sensor 4 can freely, easily, and appropriately be attached to and detached from the electronic pen 1, a new function can be added to the electronic pen 1 by utilizing this configuration. For example, when the electronic pen 1 is of the active capacitive system, power is required to drive an oscillator to transmit a signal from the core body. In this case, in order to charge a battery mounted in the electronic pen 1, there can be provided a charging terminal that becomes connectable when a side attachment member is detached and the inside of the housing 11 is exposed. Through this charging terminal, the battery can be charged.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:
a circuit board including one or more push switches;
a housing having a cylindrical body in which an electronic pen circuit including the circuit board is mounted, the housing including a side opening at a position corresponding to a range in which the one or more push switches are provided on the circuit board mounted at a predetermined position;
a board protection member including:
a main body part provided in the housing, the main body part covering a surface of the circuit board on which the one or more push switches are provided, and the main body part including one or more main body openings corresponding to respective ones of the one or more push switches;
one or more depression parts each provided in a corresponding one of the one or more main body openings, each of the one or more depression parts being coupled to the main body part only at one end of the main body part on a first side of the corresponding one of the one or more main body openings such that each of the one or more depression parts, in operation, is movable toward a corresponding one of the one or more push switches; and
a side attachment member including:
a plate part that is detachably attached to the side opening of the housing and that includes one or more plate openings corresponding to respective ones of the one or more depression parts; and
one or more push parts each provided in a corresponding one of the one or more plate openings, each of the one or more push parts being coupled to the plate part only at one end of the plate part on a second side of the corresponding one of the one or more plate openings such that each of the one or more push parts, in operation, is movable toward a corresponding one of the one or more push switches, the second side being opposite the first side,
wherein, when one of the one or more push parts of the side attachment member is moved toward the corresponding one of the one or more push switches, the corresponding one of the one or more push switches on the circuit board is pushed via a corresponding one of the one or more depression parts of the board protection member.

2. The electronic pen according to claim 1,
wherein each of the one or more depression parts of the board protection member is coupled to the main body part via a main body support part extending from the one end on the first side in the corresponding one of the one or more main body openings of the main body part, and
wherein each of the one or more push parts of the side attachment member is coupled to the plate part via a plate support part extending from the one end on the second side in the corresponding one of the one or more plate openings of the plate part.

3. The electronic pen according to claim 1,
wherein each of the one or more depression parts of the board protection member includes a depression protrusion that, in operation, pushes the corresponding one of the one or more push switches on the circuit board, and
wherein each of the one or more push parts of the side attachment member includes a push protrusion that, in operation, pushes the corresponding one of the one or more depression parts of the board protection member.

4. The electronic pen according to claim 3, wherein a push knob including the push protrusion is attached to each of the one or more push parts of the side attachment member.

5. The electronic pen according to claim 1,
wherein the one or more push parts of the side attachment member include three push parts, and
wherein a protrusion is provided on an operation surface of one of the three push parts.

6. The electronic pen according to claim 1,
wherein the one or more push parts of the side attachment member include three push parts, and
wherein respective thicknesses of at least two of the three push parts are different.

7. The electronic pen according to claim 1,
wherein the one or more push parts of the side attachment member include two push parts, and
wherein a protrusion is provided on an operation surface of one of the two push parts.

8. The electronic pen according to claim 1,
wherein the one or more push parts of the side attachment member includes two push parts, and
wherein respective thicknesses of the two push parts are different.

9. The electronic pen according to claim 1, further comprising:
a grip member that has a cylindrical body attachable to the housing and that includes a grip opening at a position corresponding to the side opening of the housing when the grip member is attached to the housing,
wherein the side attachment member that is attached to the electronic pen with the grip member attached to the housing has a thickness increased by a thickness of the grip member in a direction intersecting an axis of the electronic pen.

* * * * *